United States Patent
Wei

(10) Patent No.: US 9,304,258 B2
(45) Date of Patent: Apr. 5, 2016

(54) OPTICAL FIBER GRATING TRACKER AND METHOD FOR DETECTING OPTICAL FIBER LINE FAULT

(71) Applicant: T&S Communications Co., Ltd., Shenzhen, Guangdong (CN)

(72) Inventor: Guangyuan Wei, Guangdong (CN)

(73) Assignee: T&S COMMUNICATIONS CO., LTD., Shenzhen (CN)

( * ) Notice: Subject to any disclaimer, the term of this patent is extended or adjusted under 35 U.S.C. 154(b) by 183 days.

(21) Appl. No.: 13/845,155

(22) Filed: Mar. 18, 2013

(65) Prior Publication Data

US 2014/0085626 A1    Mar. 27, 2014

(30) Foreign Application Priority Data

Sep. 24, 2012 (CN) .......................... 2012 1 0358287

(51) Int. Cl.
| | |
|---|---|
| *G02B 6/34* | (2006.01) |
| *G02B 6/38* | (2006.01) |
| *G01M 11/00* | (2006.01) |
| *H04B 10/071* | (2013.01) |

(52) U.S. Cl.
CPC ............... *G02B 6/34* (2013.01); *G01M 11/31* (2013.01); *G02B 6/38* (2013.01); *G02B 6/3845* (2013.01); *G02B 6/3846* (2013.01); *H04B 10/071* (2013.01)

(58) Field of Classification Search
None
See application file for complete search history.

(56) References Cited

U.S. PATENT DOCUMENTS

| | | | | | |
|---|---|---|---|---|---|
| 5,841,131 | A | * | 11/1998 | Schroeder | G01D 3/036 250/227.14 |
| 5,859,944 | A | * | 1/1999 | Inoue | G02B 6/021 385/37 |
| 6,069,988 | A | * | 5/2000 | Kokura | G02B 6/021 385/123 |
| 6,185,358 | B1 | * | 2/2001 | Park | G02B 6/02085 385/140 |
| 6,490,931 | B1 | * | 12/2002 | Fernald | G01L 11/025 73/705 |
| 6,519,388 | B1 | * | 2/2003 | Fernald | G02B 6/022 385/123 |
| 6,549,712 | B2 | * | 4/2003 | Abe | G02B 6/02123 385/123 |

(Continued)

FOREIGN PATENT DOCUMENTS

| | | | |
|---|---|---|---|
| CN | 201508279 U | * | 6/2010 |
| JP | 56092504 A | * | 7/1981 |

(Continued)

*Primary Examiner* — Gordon J Stock, Jr.

(57) ABSTRACT

An optical fiber grating tracker includes a first stub, a second stub, an optical fiber grating, and a connection part. The connection part has a through hole. The first stub is inserted into one end of the through hole. The second stub is inserted into the other end of the through hole. An interval exists between the first stub and the second stub. The optical fiber grating is in the through hole and in the interval. A space in the through hole is filled with a waterproof material. The optical fiber grating tracker and the method for detecting an optical fiber line fault can detect an optical fiber fault from an optical fiber truck to the optical fiber grating tracker through an optical splitter, and meanwhile do not affect normal communication of an original optical communication network.

4 Claims, 4 Drawing Sheets

(56) References Cited

U.S. PATENT DOCUMENTS

| | | | |
|---|---|---|---|
| 6,626,043 B1 * | 9/2003 | Bailey et al. ................... 73/705 |
| 6,776,534 B2 * | 8/2004 | Takahashi et al. .............. 385/76 |
| 7,406,877 B2 * | 8/2008 | Maurin ........................... 73/800 |
| 7,515,781 B2 * | 4/2009 | Chimenti ................ G01L 1/246 |
| | | | 385/12 |
| 8,588,571 B1 * | 11/2013 | Lam .................... G02B 6/3825 |
| | | | 385/135 |
| 2002/0009279 A1 * | 1/2002 | Maron ................. G01L 9/0039 |
| | | | 385/137 |
| 2008/0019642 A1 * | 1/2008 | Kewitsch ............ G02B 6/3825 |
| | | | 385/72 |
| 2010/0284646 A1 * | 11/2010 | Chiang .............. G01K 11/3206 |
| | | | 385/13 |
| 2011/0229099 A1 * | 9/2011 | Hartog ................... G01L 1/242 |
| | | | 385/104 |
| 2011/0268438 A1 * | 11/2011 | Daems ........................... 398/16 |
| 2014/0353476 A1 * | 12/2014 | Bachar et al. ............ 250/227.24 |

FOREIGN PATENT DOCUMENTS

| | | | |
|---|---|---|---|
| JP | 2002221674 A | * | 8/2002 |
| JP | 2007079388 A | * | 3/2007 |
| WO | WO 9631022 A1 | * | 10/1996 |

* cited by examiner

OPTICAL FIBER GRATING TRACKER AND METHOD FOR DETECTING OPTICAL FIBER LINE FAULT

CROSS REFERENCE TO RELATED APPLICATIONS

This application claims the CN priority of CN 201210358287.6, filed on Sep. 24, 2012. The contents of CN 201210358287.6 are all hereby incorporated by reference.

BACKGROUND

1. Technical Field

The present application relates to the field of optical communications, and in particular, to an optical fiber grating tracker and a method for detecting an optical fiber line fault.

2. Related Arts

An optical fiber grating is an optical fiber passive device, and actually an optical fiber, where a fiber core of the optical fiber has a structure having a refractive index changed periodically or called a Bragg reflector in the optical fiber core. By means of ultraviolet light sensitivity of an optical fiber material, through methods such as a two beam interference method and a phase mask method, a bare fiber is exposed from the side surface to an interference pattern of an ultraviolet light beam, so as to write the interference pattern to the optical fiber and form a space phase grating inside the fiber core. After an optical signal with a specific spectrum width passes through the optical fiber grating, an optical wave with a specific wavelength is reflected along the original path, and optical signals with other wavelengths are transmitted directly. According to the mode coupling theory, a wave with a wavelength of λB=2 nΛ is reflected by the optical fiber grating (λB is a center wavelength of the optical fiber grating, Λ is a grating period, and n is an effective refractive index of the fiber core). The reflected center wavelength signal λB is related to the grating period Λ and the effective refractive index n of the fiber core. The reflected wavelength λ is changed as factors such as the external temperature and the stress change.

The optical fiber grating belongs to a reflection-type work device. When continuous broadband light emitted from an optical source is incident through a transmission optical fiber, a coupling effect occurs between the light and an optical field, corresponding narrowband light is selectively reflected for the broadband light and returns along the original transmission optical fiber, and other broadband light is directly transmitted.

The optical fiber grating has the advantages such as anti-electromagnetism, anti-corrosion, high temperature resistance, not having electricity, not generating heat, flame-proof, anti-explosion, having light weight, having small volume, being capable of running safely in a harmful or dangerous environment. With the rapid increase of social information demands, as one of main pillars in the information field, the optical communication faces new challenges continuously, so the optical communication needs to be continuously updated and improved, so as to adapt to the rapid development of the information society. The optical fiber grating is already applied to aspects such as a laser source, an optical amplifier, optical signal processing, wavelength division multiplexing, optical adding/dropping, and optical filtering in the optical communication field. The optical fiber grating may be used to manufacture a large-power optical fiber laser, a narrowband laser, and a tunable laser. The optical fiber grating may be used to manufacture a gain flattening filter for gain balance of an EDFA. The optical fiber grating may be used to manufacture an optical fiber dispersion compensator. The optical fiber grating may be used to manufacture a dense wavelength division multiplexing device and a network adder/dropper. The optical fiber grating may be used to implement ultra-narrowband filtering.

In an optical fiber network, damage and fault location of the optical fiber mainly relies on an Optical Time Domain Reflection (OTDR) technology. The principle of the OTDR technology is similar to that of the existing ultrasonic reversing radar.

It can be known according to the electromagnetic field theory that, due to affection of factors such as microscopic density changes and constituent fluctuations of the fiber core medium material, an incident photon and a medium molecule interact with each other, so as to generate Rayleigh scattering with the same frequency as the incident light, and moreover, a nonlinear collision occurs between the incident photon and the medium molecule due to a nonlinear effect of the medium. In an inelasticity process, the photon and the molecule exchange energy, a motion direction of the photon changes and meanwhile a part of energy of the photon is delivered to the molecule, or energy of vibration and rotation of the molecule is delivered to the photon, so as to change the frequency of the photon. This process is called Raman scattering.

When an optical pulse is transmitted along the optical fiber, each point of the optical fiber generates Rayleigh scattering, where the scattering is isotropic, and a part of scattering light returns along the optical fiber. If time begins to be counted at the moment when the optical pulse enters the optical fiber, a scattered echo signal received at an injection end at a different point of time t is characterized in that, the signal is generated by an optical fiber at a distance of L from the injection end:

$$L = \frac{ct}{2n}$$

In the equation, t is a point of time when the optical pulse returns, L is a scattering position of the optical fiber, c is a light speed in vacuum, and n is a refractive index of the optical fiber core.

It can be seen from the above equation that, once the optical fiber is determined, the refractive index of the optical fiber is also determined, and a light transmission speed in the optical fiber is determined accordingly. The transmission speed is 200,000 kilometers per second, and the roundtrip time is added, so as to implement space location of the optical fiber network through the OTDR technology. This method for damage and fault location of the optical fiber is the unique detection method in the current optical network, but the method is only applicable to a single optical fiber. If an optical fiber branch exists in the network, the OTDR cannot perform damage and fault location of the optical fiber branch.

SUMMARY

In order to overcome the shortcomings in the prior art, the present application provides an optical fiber grating tracker and a method for detecting an optical fiber line fault, so as to achieve the objective of detecting a fault from an optical splitter to each optical fiber branch in an optical communication network with the optical splitter.

In order to achieve the above objective, the present application provides an optical fiber grating tracker.

An optical fiber grating tracker includes a first stub, a second stub, an optical fiber grating, and a connection part, where the connection part has a through hole, the first stub is inserted into one end of the through hole, the second stub is inserted into the other end of the through hole, an interval exists between the first stub and the second stub, the optical fiber grating is in the through hole and in the interval, and a space in the through hole is filled with a waterproof material.

Preferably, the waterproof material is silicone oil.

Preferably, an end surface of the first stub in the through hole is provided with a circular conical surface beneficial for an optical fiber to be inserted into an optical fiber cavity of the first stub, and/or an end surface of the second stub in the through hole is provided with a circular conical surface beneficial for an optical fiber to be inserted into an optical fiber cavity of the second stub.

In order to achieve the above objective, the present application provides another optical fiber grating tracker.

An optical fiber grating tracker includes a first stub, a second stub, an optical fiber grating, and a connection part, where the connection part has a through hole, the first stub is inserted into one end of the through hole, the second stub is inserted into the other end of the through hole, one end of the first stub in the through hole and/or one end of the second stub in the through hole is provided with a cavity, the optical fiber grating is in the cavity, and the cavity is filled with a waterproof material.

Preferably, the waterproof material is silicone oil.

Preferably, an end surface of the first stub in the through hole is provided with a circular conical surface beneficial for an optical fiber to be inserted into an optical fiber cavity of the first stub, and/or an end surface of the second stub in the through hole is provided with a circular conical surface beneficial for an optical fiber to be inserted into an optical fiber cavity of the second stub.

In order to achieve the above objective, the present application further provides a method for detecting an optical fiber line fault by using the optical fiber grating tracker, where the method includes the following steps:

1) connecting each of at least two output ends of an optical splitter to an optical fiber grating tracker through an optical fiber, and connecting an input end of the optical splitter to an optical emission and detection device through an optical fiber, an optical fiber grating tracker disposed near the input end of the optical splitter, and an optical fiber in order, in which reflection wavelengths of the optical fiber grating trackers are different from each other and different from an optical wavelength of a communication system;

2) the optical emission and detection device emitting a light beam of light with multiple wavelengths or emitting a light beam with a specific bandwidth range towards the optical fiber grating trackers, in which the light beam includes light with reflection wavelengths of all the optical fiber grating trackers;

3) if receiving light with a wavelength corresponding to the optical fiber grating tracker near the input end of the optical splitter and not receiving light with a certain wavelength corresponding to an optical fiber grating tracker at a side of the output end of the optical splitter, the optical emission and detection device judging that a fault exists on an optical fiber between the optical splitter and the optical fiber grating tracker corresponding to the light with the wavelength not detected.

In order to achieve the above objective, the present application further provides a method for detecting an optical fiber line fault by using the optical fiber grating tracker.

A method for detecting an optical fiber line fault by using the optical fiber grating tracker includes the following steps:

1) connecting each of at least two output ends of an optical splitter to an optical fiber grating tracker through an optical fiber, and connecting an input end of the optical splitter to an optical emission and detection device through an optical fiber, where distances from the optical fiber grating trackers to the optical emission and detection device are different, and bandwidths of reflection wavelengths of the optical fiber grating trackers are consistent, each has a certain width, and the reflection wavelengths are different from an optical wavelength of a communication system;

2) the optical emission and detection device emitting a light beam with a specific bandwidth towards the optical fiber grating trackers, in which a wavelength range of the light beam is within the bandwidth of the reflection wavelength of the optical fiber grating tracker;

3) if receiving light reflected by all the optical fiber grating trackers, the optical emission and detection device judging that optical fibers from the optical emission and detection device to all the optical fiber grating trackers are normal; if not receiving light reflected by an optical fiber grating tracker at a specific distance from the optical emission and detection device, the optical emission and detection device judging that a fault exists on an optical fiber between the optical splitter and the optical fiber grating tracker having reflected light not detected.

The beneficial effects of the present application are that, the optical fiber grating tracker may be applicable to all-fibers integration and has advantages such as being passive, having a fast speed, having a high isolation degree, having a narrow channel bandwidth, having a simple structure, and having a small size, the optical fiber grating line tracker is easily connected to the optical fiber, where the coupling loss is small and the anti-interference capability is strong, and the optical fiber grating tracker concentrates optical line tracking and light transmission, has strong multiplexing capability, and does not affect normal communication of an original optical communication network after being connected to an optical fiber network.

DETAILED DESCRIPTION OF EMBODIMENTS

Detailed embodiments of the present application are described in further detail below with reference to the accompanying drawings.

Figure 1:
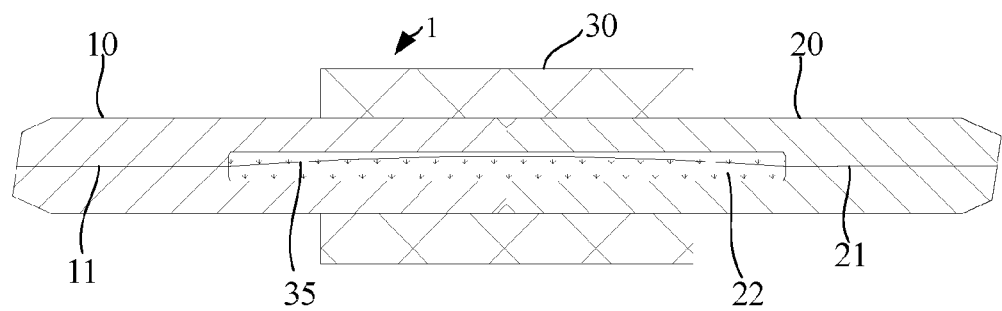
FIG. 1 is a schematic sectional view of an optical fiber grating tracker according to an embodiment.
Figure 2:
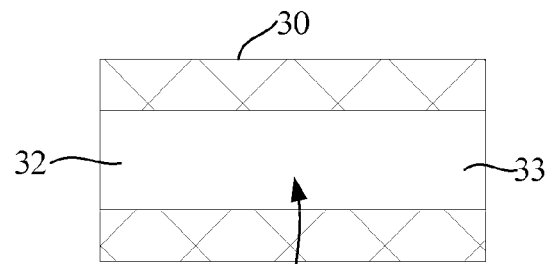
FIG. 2 is a schematic sectional view of a connection part of an optical fiber grating tracker according to an embodiment.
Figure 3:
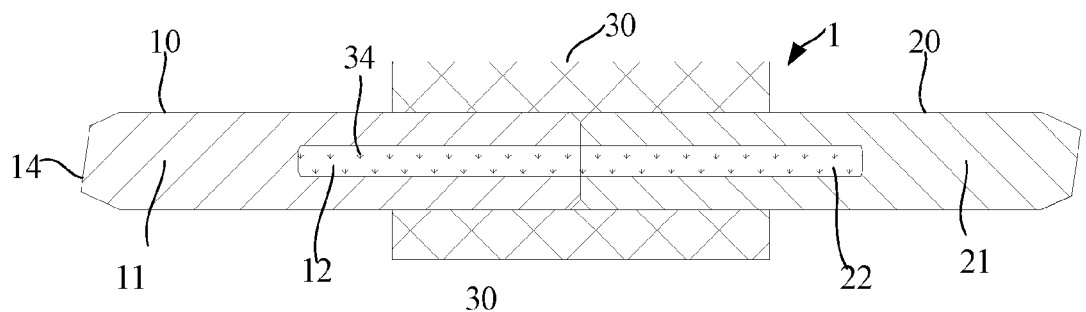
FIG. 3 is a schematic sectional view of an assembly of a first stub, a second stub, and a connection part in FIG. 1.

As shown in FIG. 1 to FIG. 3, an optical fiber grating tracker 1 according to an embodiment includes a first stub 10, a second stub 20, an optical fiber grating 35, and a connection part 30. The connection part 30 has a through hole 31. The first stub 10 has a first optical fiber cavity 11. The second stub 20 has a second optical fiber cavity 21. The first stub 10 is inserted into one end 32 of the through hole 31. The second stub 20 is inserted into the other end 33 of the through hole 31. One end of the first stub 10 in the through hole 31 is provided with a first cavity 12. One end of the second stub 20 in the through hole 31 is provided with a second cavity 22. The optical fiber grating 35 is in the first cavity 12 and the second cavity 22. The first cavity 12 and the second cavity 22 are filled with a waterproof material 34. The optical fiber grating 35 surrounded by the waterproof material 34 can be effectively separated from water, so as to achieve the moisture-proof effect and enable the optical fiber or the optical fiber grating to keep the properties thereof for a long time. The waterproof material 34 may be silicone oil.

The first stub 10 and the second stub 20 do not need to be provided with cavities simultaneously as long as at least one of the first stub 10 and the second stub 20 is provided with a cavity. During manufacturing of the optical fiber grating tracker 1, for example, an optical fiber with the optical fiber grating 35 is inserted from the first optical fiber cavity 11 of the first stub 10 until the optical fiber grating 35 is in the first cavity 12 and the second cavity 22, so a part of the optical fiber is in the first optical fiber cavity 11 and the second optical fiber cavity 21. The optical fiber grating 35 can be in a free or bent state due to the cavity. In this way, a temperature characteristic of the optical fiber grating 35 can reach an optimal essential state of the optical fiber, that is, a wavelength temperature characteristic of 10 pm/° C.

The first stub 10 or the second stub 20 may be a cylinder, an outer diameter may be 2.5 mm, and an inner diameter may be 0.125 mm. An end surface 14, not in the through hole 31, of the first stub 10 and another end surface, not in the through hole, of the second stub 20 may be ground into a PC spherical surface or an APC oblique spherical surface, and are assembled into an optical fiber connector and optical fiber adapter structure such as an FC, an SC, an ST, an LC, or an MU, so as to be connected to another optical fiber joint. The first stub 10 and/or the second stub 20 may be a ceramic stub, a glass stub, or a metal stub. The connection part 30 may be of a metal or plastic material.

Figure 4:
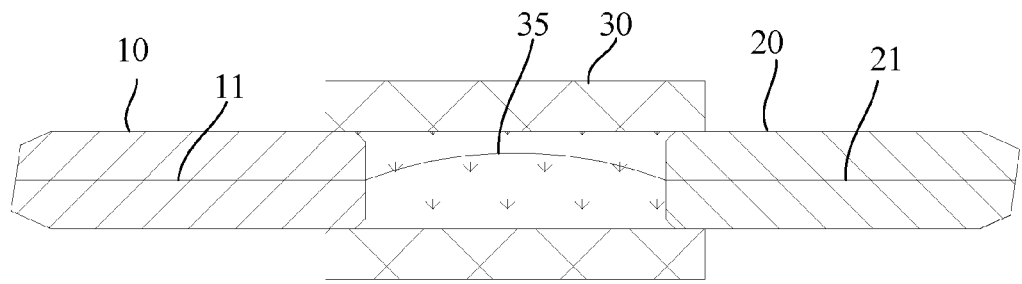
FIG. 4 is a schematic sectional view of an optical fiber grating tracker according to another embodiment.
Figure 5:
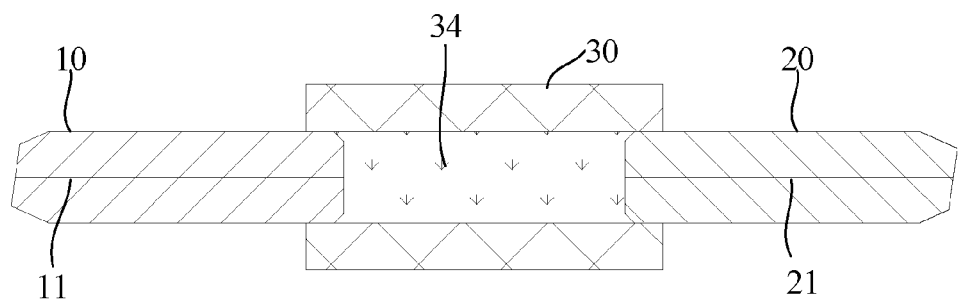
FIG. 5 is a schematic sectional view of an assembly of a first stub, a second stub, and a connection part in FIG. 4.

As shown in FIG. 2, FIG. 4, and FIG. 5, an optical fiber grating tracker 1 according to an embodiment includes a first stub 10, a second stub 20, an optical fiber grating 35, and a connection part 30. The connection part 30 has a through hole 31. The first stub 10 is inserted into one end 32 of the through hole 31. The second stub 20 is inserted into the other end 33 of the through hole 31. An interval, that is, a partial space of the through hole 31, exists between the first stub 10 and the second stub 20. The length of the partial space may be 6 mm. The optical fiber grating 35 is in the through hole 31 and in the interval. A space in the through hole 31 is filled with a waterproof material 34.

Figure 6:
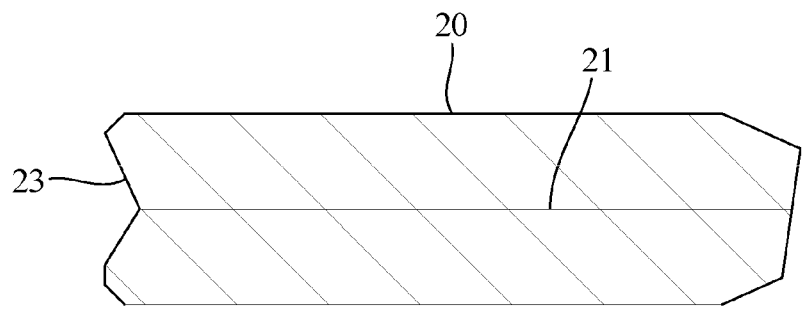
FIG. 6 is a schematic sectional view of a second stub of an optical fiber grating tracker according to an embodiment.
Figure 7:
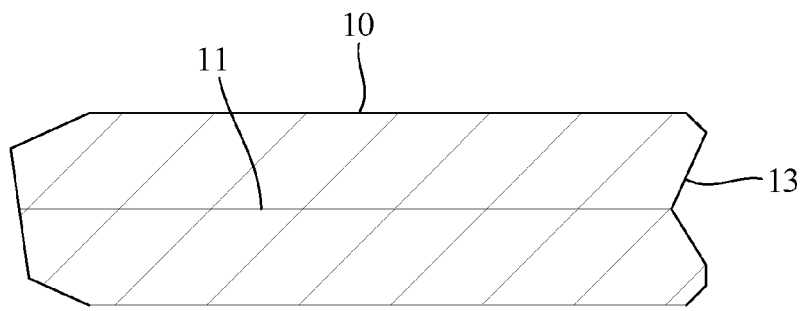
FIG. 7 is a schematic sectional view of a first stub of an optical fiber grating tracker according to an embodiment.

As shown in FIG. 6 and FIG. 7, an end surface, inserted into the through hole 31, of the second stub 20 is a circular conical surface 23 narrowing towards a second optical fiber cavity 21. When an optical fiber is inserted into the second optical fiber cavity 21 from a direction of the first stub 10, the circular conical surface 23 is beneficial for the optical fiber to enter the second optical fiber cavity 21. Similarly, the first stub 10 also has a circular conical surface 13 narrowing towards a first optical fiber cavity 11.

Figure 8:
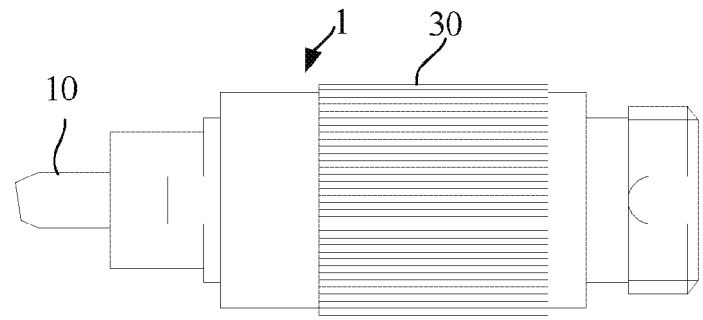
FIG. 8 is a schematic front view of an optical fiber grating tracker according to an embodiment.

As shown in FIG. 8, one end of the optical fiber grating tracker 1 near the first stub 10 may be of an optical fiber joint structure, and one end of the optical fiber grating tracker 1 near the second stub 20 may be of an optical fiber adapter structure, so as to be connected to an optical fiber access end and an FTTH subscriber end in series.

Figure 9:
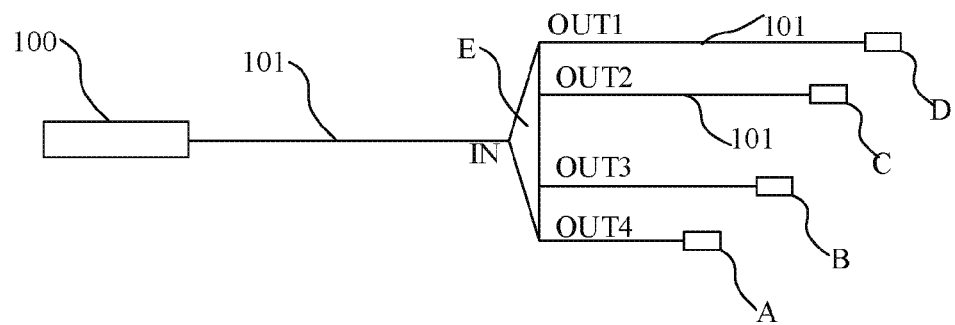
FIG. 9 is a schematic diagram of a system for detecting an optical fiber line fault according to an embodiment.

FIG. 9 is a schematic diagram of a system for detecting an optical fiber line fault. As shown in FIG. 9, the system includes a optical emission and detection device 100, an optical splitter E, a first optical fiber grating tracker A, a second optical fiber grating tracker B, a third optical fiber grating tracker C, and a fourth optical fiber grating tracker D.

An input end of the optical splitter E is connected to the optical emission and detection device 100 through an optical fiber. Four output ends of the optical splitter E are connected to the first optical fiber grating tracker A, the second optical fiber grating tracker B, the third optical fiber grating tracker C, and the fourth optical fiber grating tracker D respectively. Distances from the first optical fiber grating tracker A, the second optical fiber grating tracker B, the third optical fiber grating tracker C, and the fourth optical fiber grating tracker D to the optical splitter E are d1, d2, d3, and d4 in order, where d1<d2<d3<d4. A distance from the optical splitter E to the optical emission and detection device 100 is d5.

In a method for detecting an optical fiber line fault according to an embodiment, reflection wavelengths of the first optical fiber grating tracker A, the second optical fiber grating tracker B, the third optical fiber grating tracker C, and the fourth optical fiber grating tracker D are the same and different from an optical wavelength of an optical communication system. Generally, optical wavelengths for system communication are 1310 nm and 1550 nm, and a specific optical wavelength for a diagnostic test may be 1650 nm. Generally, a center wavelength of the optical fiber grating tracker is designed to be outside a network communication wavelength bandwidth and generally uses a maintenance wave band. In this way, when the optical fiber grating tracker is concatenated in the communication network, the original optical communication quality is not affected.

S1: The optical emission and detection device 100 emits light with a specific wavelength to the optical splitter E, and the light with the specific wavelength is transmitted to the four optical fiber grating trackers.

S2: The optical emission and detection device 100 begins to receive reflected light with the specific wavelength, and if the optical emission and detection device 100 does not receive light with the specific wavelength reflected by an optical fiber grating tracker corresponding to a certain distance, the optical emission and detection device 100 judges that a fault exists on an optical fiber between the optical splitter E and the optical fiber grating tracker. For example, if the optical emission and detection device 100 does not receive light with the specific wavelength reflected by the first optical fiber grating tracker A at a distance of d1 from the optical splitter E, the optical emission and detection device 100 judges that a fault exists on an optical fiber between the optical splitter E and the first optical fiber grating tracker A.

If the optical emission and detection device 100 is connected near the input end of the optical splitter E, the above steps can achieve the purpose of detecting the fault between the optical fiber grating tracker and the optical splitter E, but if the optical emission and detection device 100 is disposed at a place far away from the optical splitter E, for example, a local end of the optical communication system, the following step is further included between step S1 and step S2.

If the optical emission and detection device 100 identifies that no fault exists on an optical fiber between the optical emission and detection device 100 and the optical splitter E through the OTDR technology, the optical emission and detection device 100 executes step S2.

If the optical emission and detection device 100 can detect that a light wave reflected by at least one optical fiber grating tracker following the optical splitter exists, a fault does not exist on the optical fiber between the optical emission and detection device 100 and the optical splitter E.

In this way, the optical emission and detection device 100 can implement on-line monitoring, and meanwhile can monitor on-off of optical fibers of each trunk and branch. A monitoring distance may reach 40 km. A host can monitor hundreds of optical fiber lines.

Figure 10:
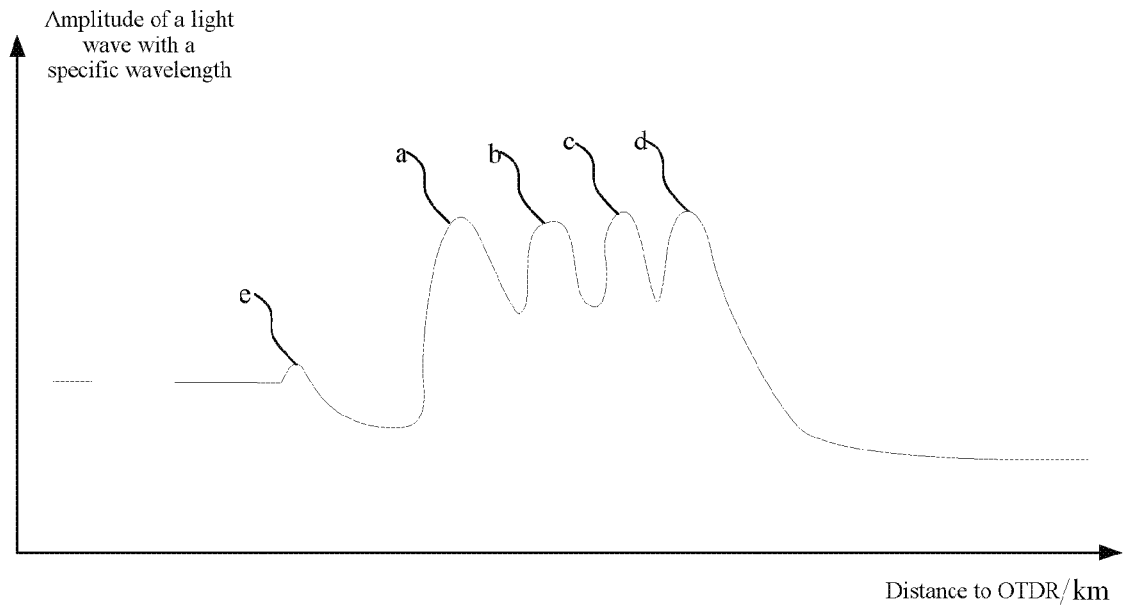
FIG. 10 is a curve diagram of "distance to an OTDR curve-amplitude of a light wave with a specific wavelength" corresponding to FIG. 9.

The optical emission and detection device 100 may be an OTDR device. FIG. 10 is a curve diagram of "distance to an OTDR curve-amplitude of a light wave with a specific wavelength" of a light wave detected by the optical emission and detection device 100. As shown in FIG. 10, wave crests a, b, c, d, and e represent amplitude of light waves reflected by the first optical fiber grating tracker A, the second optical fiber grating tracker B, the third optical fiber grating tracker C, the fourth optical fiber grating tracker D, and the optical splitter E respectively.

Figure 11:
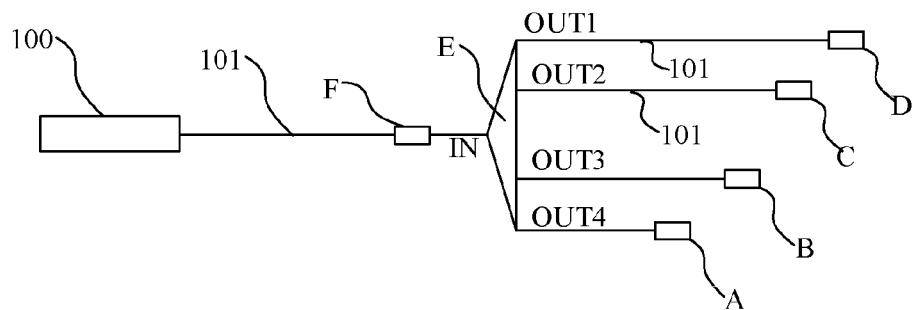
FIG. 11 is a diagram of a system for detecting a fault of an optical communication system according to another embodiment.

As shown in FIG. 11, in another embodiment, another method for detecting an optical fiber line fault may also be used.

Reflection wavelengths of a first optical fiber grating tracker A, a second optical fiber grating tracker B, a third optical fiber grating tracker C, a fourth optical fiber grating tracker D, and a fifth optical fiber grating tracker F are different from one another and different from an optical wavelength for optical communication.

A fourth output end OUT4, a third output end OUT3, a second output end OUT2, and a first output end OUT1 of an optical splitter E are connected to the first optical fiber grating tracker A, the second optical fiber grating tracker B, the third optical fiber grating tracker C, and the fourth optical fiber grating tracker D through optical fibers 101 respectively. An input end IN of the optical splitter E is connected to an optical emission and detection device 100 through an optical fiber 101 and the fifth optical fiber grating tracker F disposed near the input end IN of the optical splitter E in order.

The emission and detection device 100 is a wavelength detection device and emits a light beam of light with multiple wavelengths or a beam of broadband light towards the optical fiber grating trackers. All light waves reflected by the optical fiber grating trackers are included in the light beam. For example, a wavelength of light reflected by the fifth optical fiber grating tracker F is $\lambda 1$, a wavelength of light reflected by the first optical fiber grating tracker A is $\lambda 2$, and the light beam at least includes light of wavelengths $\lambda 1$ and $\lambda 2$.

If the optical emission and detection device 100 does not receive light with the wavelength $\lambda 1$, the optical emission and detection device 100 judges that a fault exists on the optical fiber 101 between the optical splitter E and the optical emission and detection device 100.

If the optical emission and detection device 100 receives light with the wavelength $\lambda 1$, and the optical emission and detection device 100 does not receive light with the wavelength $\lambda 2$ corresponding to the first optical fiber grating tracker A at a side of the output end OUT4 of the optical splitter E, the optical emission and detection device 100 judges that a fault exists on the optical fiber 101 between the optical splitter E and the first optical fiber grating tracker A. Generally, the optical emission and detection device 100 is disposed at a place far away from the optical splitter E, for example, a local end of the optical communication system.

Figure 12:
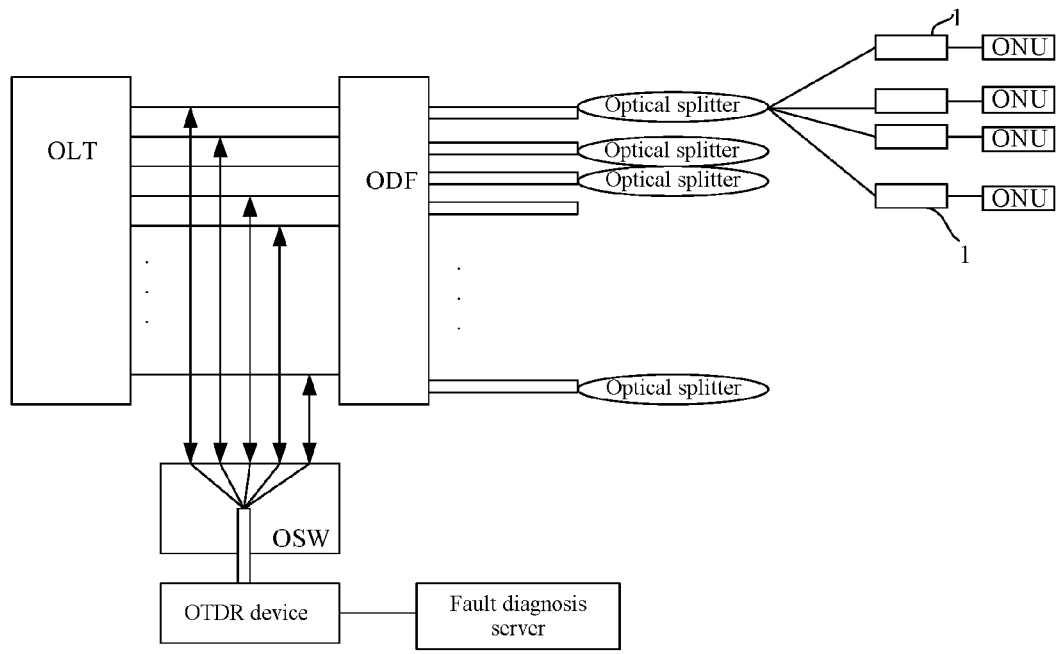
FIG. 12 is a diagram of a system for detecting a fault of an optical communication system according to another embodiment.

FIG. 12 is a diagram of a system for detecting a fault of an optical communication system according to a more specific embodiment. As shown in FIG. 12, an optical line terminal OLT is connected to an input end of an optical splitter through an optical fiber and an optical fiber distribution frame ODF. Multiple output ends of the optical splitter are connected to different optical nodes ONUs. An optical fiber grating tracker 1 may be mounted between each output end of the optical splitter and the connected optical node ONU. A wavelength reflected by the optical fiber grating tracker 1 is outside a range of a communication wavelength, a communication light wave can still pass through the optical fiber grating tracker 1, thereby not affecting optical communication. An optical emission and detection device 100 is an OTDR device. The OTDR device is connected to optical fibers of multiple input ends of the optical fiber distribution frame ODF through an optical switch OSW. A fault diagnosis server is connected to the OTDR device, so as to drive an optical network test apparatus such as the OTDR to perform diagnostic analysis on a fault of an optical fiber line, thereby implementing functions such as optical fiber breakpoint positioning and optical fiber attenuation reason finding.

What is claimed is:

1. An optical fiber grating tracker, comprising a first stub, a second stub, an optical fiber grating, and a connection part, wherein the connection part has a through hole, the first stub is inserted into one end of the through hole, the second stub is inserted into the other end of the through hole, an interval exists between the first stub and the second stub, the optical fiber grating is in the through hole and in a bent state in the interval such that a temperature characteristic of the optical fiber grating reach a wavelength temperature characteristic of 10 pm/° C., and a space in the through hole is filled with a waterproof material; or comprising a first stub, a second stub, an optical fiber grating, and a connection part, wherein the connection part has a through hole, the first stub is inserted into one end of the through hole, the second stub is inserted into the other end of the through hole, one end of the first stub in the through hole and/or one end of the second stub in the through hole is provided with a cavity, the optical fiber grating is in a bent state in the cavity such that a temperature characteristic of the optical fiber grating reach a wavelength temperature characteristic of 10 pm/° C., and the cavity is filled with a waterproof material.

2. The optical fiber grating tracker according to claim 1, wherein the waterproof material is silicone oil.

3. The optical fiber grating tracker according to claim 1, wherein an end surface of the first stub in the through hole is provided with a circular conical surface beneficial for an optical fiber to be inserted into an optical fiber cavity of the first stub, and/or an end surface of the second stub in the through hole is provided with a circular conical surface beneficial for an optical fiber to be inserted into an optical fiber cavity of the second stub.

4. A method for detecting an optical fiber line fault by using an optical fiber grating tracker, the optical fiber grating tracker comprising a first stub, a second stub, an optical fiber grating, and a connection part, wherein the connection part has a through hole, the first stub is inserted into one end of the through hole, the second stub is inserted into the other end of the through hole, an interval exists between the first stub and the second stub, the optical fiber grating is in the through hole and in a bent state in the interval such that a temperature characteristic of the optical fiber grating reach a wavelength temperature characteristic of 10 pm/° C., and a space in the through hole is filled with a waterproof material; or comprising a first stub, a second stub, an optical fiber grating, and a connection part, wherein the connection part has a through hole, the first stub is inserted into one end of the through hole, the second stub is inserted into the other end of the through hole, one end of the first stub in the through hole and/or one end of the second stub in the through hole is provided with a cavity, the optical fiber grating is in a bent state in the cavity such that a temperature characteristic of the optical fiber grating reach a wavelength temperature characteristic of 10 pm/° C., and the cavity is filled with a waterproof material; the method comprising the following steps:

1) connecting each of at least two output ends of an optical splitter to an optical fiber grating tracker through an optical fiber, and connecting an input end of the optical splitter to an optical emission and detection device through an optical fiber, an optical fiber grating tracker disposed near the input end of the optical splitter, and an optical fiber in order, wherein reflection wavelengths of the optical fiber grating trackers are different from each other and different from an optical wavelength of a communication system;

2) the optical emission and detection device emitting a light beam of light with multiple wavelengths or emitting a light beam with a specific bandwidth range towards the optical fiber grating trackers, wherein the light beam comprises light with reflection wavelengths of all the optical fiber grating trackers; and 3) if the optical emission and detection device receives light with a wavelength corresponding to the optical fiber grating tracker near the input end of the optical splitter and the optical emission and detection device does not receive light with a certain wavelength corresponding to an optical fiber grating tracker at a side of the output end of the optical splitter, the optical emission and detection device judging that a fault exists on an optical fiber between the optical splitter and the optical fiber grating tracker corresponding to the light with the wavelength not detected.

\* \* \* \* \*